Nov. 7, 1967  A. A. WRIDT  3,351,358
TELESCOPING DRAWBAR
Filed Sept. 27, 1965
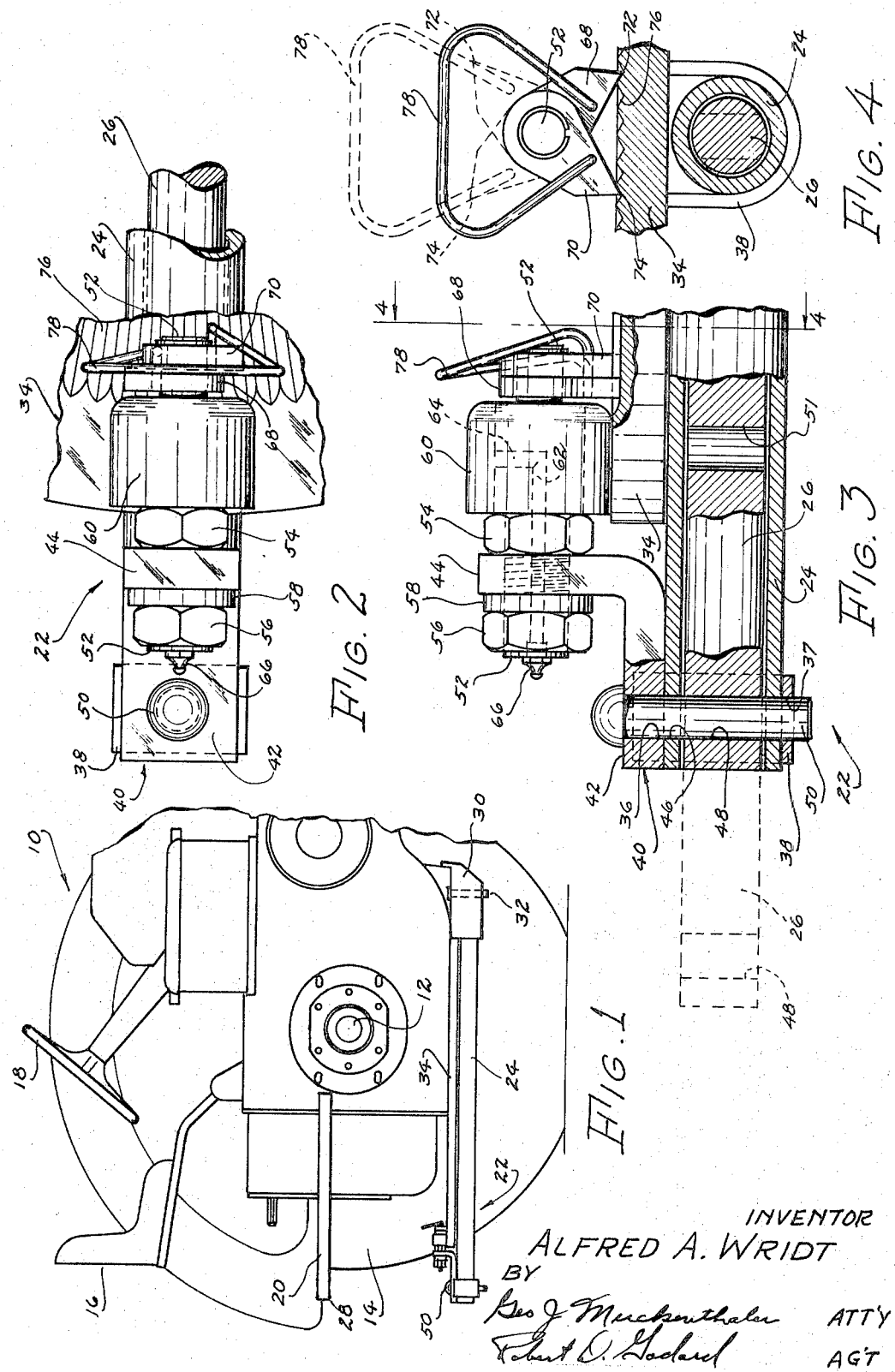
INVENTOR
ALFRED A. WRIDT
BY
Geo. J. Muckenthaler  ATT'Y
Robert O. Godard  AG'T

3,351,358
TELESCOPING DRAWBAR
Alfred A. Wridt, Racine, Wis., assignor to J. I. Case Company, Racine, Wis., a corporation of Wisconsin
Filed Sept. 27, 1965, Ser. No. 490,408
10 Claims. (Cl. 280—478)

ABSTRACT OF THE DISCLOSURE

A telescoping drawbar having one member slidable in a second member and a pin for securing these members in position. The drawbar is transversely swingable and is carried on a support by means of a roller and means are provided for locking the drawbar in one of a plurality of positions. The locking means includes spring-held dogs engageable with and disengageable from the serrated support for locking and unlocking the drawbar as it is swung into position on the support.

---

This invention relates to a tractor improvement and particularly to an improved drawbar for towing farm implements. A drawbar or hitch device is a required part of a tractor to properly propel an implement or a second vehicle, and many types of drawbars have been used in the past. Certain improvements in drawbars are necessary, and a desirable feature is to have the length of the drawbar as short as possible for improved draft on the towing vehicle, and for safety and economical reasons. Another desirable feature is to have the drawbar extend sufficiently to the rear of the tractor for ease of connecting or coupling an implement.

The main object of this invention is to provide an improved drawbar which, in one position, is of sufficient length for ease of connecting an implement and, in another position, is stored out of the way.

Another object is to provide a drawbar which can easily be moved from a retracted to an extended position, and back to the retracted position.

A further object is to provide an improved telescoping drawbar.

Another object is to provide improved means for holding the drawbar in one position or for allowing the drawbar to swing laterally, if desired.

An additional object is to provide a drawbar which can reduce operator accidents by reason of its safety features.

Further objects and advantages will be apparent from the following specification and the annexed drawings, in which:

FIGURE 1 is a side elevational view of a tractor with parts removed and embodying the present invention;

FIG. 2 is an enlarged plan view of the invention;

FIG. 3 is a side view, partly in section, of the same; and

FIG. 4 is a view taken on line 4—4 of FIG. 3.

As seen in FIG. 1, the rear end of a tractor 10 is shown with the device of the invention installed under the rear axle 12. Tractor 10 also has rear wheels 14 (only one shown), a seat 16, a steering wheel 18, and other required and well-known parts which are not necessary to describe as they form no part of the present invention. An operator's platform 20 is disposed between the wheel fenders and secured to the frame portion of the tractor.

A drawbar assembly generally designated as 22 is supported from the frame of the tractor at the rear end thereof. Drawbar assembly 22 includes a first member or sleeve 24 and a second member or rod 26, as seen in FIGS. 2, 3, and 4. Member 24 is shown in a tubular configuration and extends from a point forward of the rear axle 12 to a point below the rear edge 28 of platform 20. Member 24 is pivotally connected to a frame member 30 by means of a pin 32. The pivot point of member 24 is selected to give the advantages of improved draft and reduced tire wear. This portion of the invention, the idea of the drawbar being pivoted for swinging from one side to the other side, is known and need not be further described except to say that member 24 is manually swung by the operator, or swung by reason of draft to a desired location.

The rear portion of the drawbar assembly is supported from an annular member or quadrant 34 which outer edge is the circumference of a circle with pin 32 as the center thereof. As stated above, member 24 is shown in tubular configuration as a sleeve which extends to the rear of member 34. Member 26 is shown in the shape or form of a rod which slides in sleeve 24 a predetermined distance. Fixed on sleeve 24 is an angular element or support 40 which has a horizontal portion 42 and a vertical portion 44.

Fixed on portion 42 on each side thereof and extending around sleeve 24 is a U-shaped clamp 38 for added strength and support for the drawbar. Clamp 38 has a bore 37 defined in the round portion thereof and under sleeve 24. Portion 42 has a bore or aperture 36 spaced from the rear edge thereof and sleeve 24 has a bore or aperture 46 which aligns with bore 36. A bore or aperture 48 is defined in rod 26 spaced from the rear edge thereof and which aligns with bores 36 and 46, in one position of rod 26. A pin 50 is inserted in bores 36, 46, and 48 when rod 26 is in a stored position, as shown in FIG. 3, and when the rear edges of portion 42, sleeve 24 and rod 26 are substantially aligned. Thus, it can be seen that support 40 and sleeve 24 are reasonably fixed and do not move in a fore-and-aft direction.

Vertical portion 44 defines a threaded bore through which a partially threaded pin or shaft 52 is inserted. Adjacent portion 44 and on one side thereof is a nut 54 on pin 52, and adjacent portion 44 on the other side is a nut 56 with a washer 58 interposed between portion 44 and nut 56 on pin 52. Adjacent nut 54 and on pin 52 is a roller or rolling means 60 which engages with and is carried on member 34. Roller 60 and its mating part, member 34, are conventional in a drawbar assembly of this type, except as modified and improved in this embodiment. Roller 60 is journaled on pin 52 for rolling laterally on member 34. Pin 52 has a bore 62 defined lengthwise therein and the pin also has a bore 64 defined radially therein for passage of lubricant to the mating surfaces of roller 60 and pin 52. A conventional grease fitting 66 is inserted in the pin 52 for passage of the lubricant through bores 62 and 64 and for lubricating roller 60.

On the opposite end of pin 52 from grease fitting 66 and adjacent to roller 60 are a pair of dogs or locking means 68 and 70. Dogs 68 and 70 are pivoted on pin 52 and define tips 72 and 74. Member 34 has a number of notches or serrations 76 on the top side running from one side of the tractor to the other side or across the entire width of the quadrant or member 34.

Tips 72 and 74 of dogs 68 and 70 are positioned so as to engage with notches 76 of member 34. A spring bale handle 78 is connected to dogs 68 and 70, one end of the handle to dog 68 and the other end of the handle to dog 70. Handle 78 is so positioned in an upward direction that the operator of the tractor can easily grip the handle and move it in an up-and-down direction. Handle 78 is made of a spring steel which tends to close the ends of the handle, and when the ends are connected to dogs 68 and 70, the tips 72 and 74 tend to approach each other. In this respect, the ends of the handle 78, by reason of their location from tips 72 and 74, hold the tips in an over-centered position relative to the center line of pin 52. Thus, it is seen that when the tips 72 and 74 of dogs 68 and 70 are engaged with notches 76, the spring handle keeps the tips in the notches and roller 60 cannot be moved from its position. Since roller 60 cannot move, drawbar member 24 also cannot move from a desired position.

When the operator wishes to move the drawbar to one side or the other of the center position, he pulls handle 78 in an upward direction which moves tips 72 and 74 out of notches 76 and which allows roller 60 to move across member 34 thus swinging the drawbar to the desired location. When handle 78 is pulled up, tips 72 and 74 are again in an overcenter position and stay in this position while the operator manually moves the drawbar to one side or the other. The over-center position is extremely important when the handle is pulled up as this allows the operator to use both hands for coupling or uncoupling an implement. The notches or serrations 76 are in small increments so that there are a large number of positions for the drawbar on member 34. The dogs are locked in an over-center position either above or below the roller pin center line.

When it is desired to couple an implement to the tractor, the drawbar is moved so as to line up with the implement hitch, pin 50 is removed from member 26, member 26 is slidably pulled out of sleeve 24 to a position such that bore 51 aligns with bores 36 and 46, and pin 50 is then inserted in bores 36, 46, and 51. Member 26 is then in an extended position and bore 48 is used for coupling the implement with a conventional pin or bolt.

It will be noted from FIG. 1, that in the stored position, no part of the drawbar assembly extends past the rear edge 28 of platform 20.

This is an advantageous feature of the invention for the purpose of reducing operator accidents. If an operator slipped off the edge 28 of the platform 20, he would not fall on an exposed part of the drawbar, as it would be in the stored position. Also, when moving or walking around near the edge of the platform, the operator would not be subject to leg or knee skinning.

It will therefore be seen that herein described is an improved drawbar assembly for a tractor which is safe, easy to operate and economical to produce. While only one embodiment has been disclosed, it will be apparent that alterations and variations of the drawbar assembly may be made. It is not limited to use on a tractor but may be used on other vehicles for towing purposes.

Whenever it is desirable for the drawbar to swing freely when pulling a load, as is common, handle 78 may be left in the "up" position to retain tips 72 and 74 disengaged from notches 76 of member 34.

Other variations may occure to those skilled in the art, and it is to be understood that the invention is not limited by the specific embodiment described and illustrated, or in fact in any manner except as defined in the following claims.

What is claimed as new and desired to be secured by Letters Patent of the United States is:

1. An improvement in a drawbar of the swingable type for a tractor, said improvement comprising a first drawbar member attached to said tractor, a second drawbar member slidable in said first drawbar member, a notched support on said tractor extending transverse to said first and second members, rolling means on said support, said rolling means being connected to said first member in position to provide for swinging said first member, and biased locking means on said rolling means, said locking means being adapted to engage with said notched support in one position of said locking means and being adapted to release said locking means in another position so that said rolling means may be swung on said support.

2. An improvement in a drawbar of the swingable type for a tractor, said improvement comprising a first drawbar member attached at one end to said tractor, a second drawbar member in said first drawbar member, a notched support on said tractor extending transverse to said first and second members, rolling means on said support, said rolling means being connected to said first member in position to provide for swinging said first and second members, means connected with said rolling means and with said first member in a position to support said first member from said notched support, and biased locking means on the supporting means, said locking means being adapted to engage with said notched support in one position of said locking means and being adapted to release said locking means in another position so that said rolling means may be swung on said support.

3. A drawbar for a tractor comprising a first member extending rearwardly from an attachment point on said tractor, a second member slidably positioned in said first member, a support fixed on said tractor and having serrations thereon, rolling means on said support to provide for positioning said first and second members, said rolling means being adapted to move transverse to said support with said first and second members, means linking said rolling means and said first member for carrying said rolling means, means for holding said second member in one position in said first member and in another position in said first member when said second member is slidably moved, and locking means on said rolling means positioned to engage with said serrations and means on said locking means for releasing said locking means.

4. A drawbar for a tractor comprising a first member extending rearwardly from an attachment point on said tractor, a second member slidably positioned in said first member, a support fixed on said tractor and having serrations thereon, rolling means on said support to provide for positioning said first and second members, said rolling means being adapted to move transverse to said support with said first and second members, means linking said rolling means and said first member for carrying said rolling means, means for holding said second member in one position in said first member and in another position in said first member when said second member is slidably moved, and locking means on said rolling means positioned to engage with said serrations and hold said rolling means in a predetermined position when said locking means is in an over-center position in relation to said rolling means, and means on said locking means for releasing said locking means.

5. An improved draft means for a tractor having a support adjacent the rear thereof, said draft means including a first member connected to said tractor and extending rearwardly from the point of connection, a second member in said first member and adapted to slide in said first member, pin means for holding said second member in one of a plurality of positions in said first member, rolling means on said support, said rolling means being connected to said first member in position to support said first member and adapted to move said first and second members transversely of said support, and locking means on said rolling means positioned to engage with said support so that said draft means may be locked in any one of a plurality of locations.

6. An improved draft means for a tractor having a support adjacent the rear thereof, said draft means including a first member connected to said tractor and extending rearwardly from the point of connection, a second member in said first member and adapted to slide in said first member, pin means for holding said second member in one of a plurality of positions in said first member, rolling means on said support, said rolling means being connected to said first member in position to support said first member and adapted to move said first and second members transversely of said support, and locking means on said rolling means positioned to engage with said support so that said draft means may be locked in any one of a plurality of locations, and means for releasing said locking means.

7. In a drawbar for a tractor having a drawbar support at the rear thereof, said support being disposed transverse to the direction of travel and having a plurality of serrations thereon extending generally in the direction of travel, a pin fixed in relation to and supported from said drawbar support and extending lengthwise of said tractor, pawl means pivotally supported on said pin, said pawl means being positioned to engage with said serrations, and resilient means connected to said pawl means in a plane between said pin and said drawbar support in one position of said resilient means and pawl means, said resilient means being positioned to urge said pawl means into contact with said serrations in said position of said resilient means for retaining said drawbar in a predetermined position, and said resilient means in another position being connected to said pawl means in a plane remote from said pin and said drawbar support to urge said pawl means toward each other where they are disengaged from said serrations for allowing said drawbar to freely move along said support.

8. In a drawbar for a tractor having a drawbar supporting quadrant disposed transversely of the direction of travel, a pin fixed in relation to said drawbar and extending lengthwise of said tractor and supported from said quadrant, said quadrant defining a plurality of serrations thereon, a pair of pawls each rotatably supported and oppositely disposed on said pin, one of said pawls being in position to engage with said serrations on one side of said pin and the other of said pawls being in position to engage with said serrations on the other side of said pin, and a spring handle connected to said pawls pressing said pawls toward each other and into contact with said serrations in one position of said handle and pawls for retaining said drawbar in a predetermined position, and said handle having another position pressing said pawls toward each other where they are disengaged from said serrations for allowing said drawbar to freely move along said quadrant.

9. A telescoping drawbar for a tractor having a drawbar support at the rear thereof, said drawbar including a first member pivotally connected to said tractor and having an aperture therein, a second member adapted to be slidably moved in said first member, said second member having a plurality of apertures therein, one of which aligns with said aperture in said first member in a stored position of said second member and another of which aligns with said aperture in said first member in a towing position of said second member, an angular element fixed on said first member and having apertures therein, a shaft extending through one of the apertures of said angular element, a roller on said shaft in position to carry said first and second members on said support, a series of indentations on said support, a pair of locking means on said shaft adapted to engage with said indentations for holding said roller in one position, a spring handle connected to said locking means in position to move said locking means in an up-and-down direction whereby in one position of said handle and said locking means, said locking means will be in an over-center position in relation to said shaft thereby preventing movement of said roller and said first and second members laterally, and in another position of said handle and said locking means, said locking means will be in an over-center position in relation to said shaft thereby releasing said locking means and allowing free movement of said roller and said first and second members.

10. Locking means for a swinging drawbar of the type disposed generally longitudinally of a draft vehicle and having a pin fixed in relation to the drawbar and disposed transversely of the direction of swinging of said drawbar, a quadrant carried on the vehicle and means supporting the drawbar from the quadrant for swinging movement therealong, said quadrant providing a series of serrations thereon between said quadrant and said pin, a pawl journaled on the pin, inclined toward the quadrant in one direction and having a tip portion engaged with said serrations at one side of said pin, a second pawl journaled on the pin, inclined toward the quadrant in the other direction and having a tip portion engaged with said serrations at the other side of said pin, whereby the pin, and consequently the drawbar, is secured against lateral movement, and a resilient bale-like handle pivotally connected to one of said pawls between said pin and the tip portion of said pawl, said bale-like handle being also pivotally connected to the other of said pawls between said pin and the tip portion of said other pawl, and said handle being proportioned so that its pivotal connections to the pawls are separated from each other a distance which is greater than the spread between the pivotal connections on said handle when the latter is removed from said pawls, and said bale-like handle having another position in which said pivotal connections are disposed beyond said pin, in relation to said serrations so as to yieldingly retain said pawls removed from said serrations.

References Cited
UNITED STATES PATENTS

| | | | |
|---|---|---|---|
| 2,357,540 | 9/1944 | Palmer | 280—478 |
| 2,873,982 | 2/1959 | Graham | 280—478 |
| 2,890,896 | 6/1959 | Hendrickson | 280—499 X |
| 2,898,126 | 8/1959 | Loukonen | 280—467 |
| 3,126,210 | 3/1964 | Hill | 280—478 |
| 3,140,881 | 7/1964 | Antici | 280—478 |

LEO FRIAGLIA, *Primary Examiner.*